US009104465B2

(12) United States Patent
Fleischer et al.

(10) Patent No.: US 9,104,465 B2
(45) Date of Patent: Aug. 11, 2015

(54) MAIN PROCESSOR SUPPORT OF TASKS PERFORMED IN MEMORY

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/684,657

(22) Filed: Nov. 26, 2012

(65) Prior Publication Data

US 2014/0130051 A1    May 8, 2014

Related U.S. Application Data

(63) Continuation of application No. 13/669,877, filed on Nov. 6, 2012.

(51) Int. Cl.
*G06F 9/46* (2006.01)
*G06F 9/38* (2006.01)
*G06F 9/50* (2006.01)

(52) U.S. Cl.
CPC ............... *G06F 9/46* (2013.01); *G06F 9/3877* (2013.01); *G06F 9/5044* (2013.01); *G06F 2209/509* (2013.01); *Y02B 60/142* (2013.01)

(58) Field of Classification Search
USPC .......................................... 718/102
See application file for complete search history.

(56) References Cited

U.S. PATENT DOCUMENTS

2004/0088705 A1* 5/2004 Eslick et al. ................. 718/102
2012/0102500 A1* 4/2012 Waddington et al. ......... 718/104

OTHER PUBLICATIONS

Huong et al., Support of cross calls between a microprocessor and FPGA in CPU-FPGA coupling architecture, Apr. 2010, Parallel & Distributed Processing, Workshops and Phd Forum (IPDPSW), 2010 IEEE International Symposium on Apr. 19-23, 2010.*
U.S. Appl. No. 13/669,877; Non-Final Office Action; Date Filed: Nov. 6, 2012; Date Mailed Jul. 17, 2014; 13 pages.

* cited by examiner

*Primary Examiner* — Emerson Puente
*Assistant Examiner* — Steven Do
(74) *Attorney, Agent, or Firm* — Cantor Colburn LLP

(57) ABSTRACT

According to one embodiment of the present invention, a computer system for executing a task includes a main processor, a processing element and memory. The computer system is configured to perform a method including receiving, at the processing element, the task from the main processor, performing, by the processing element, an instruction specified by the task, determining, by the processing element, that a function is to be executed on the main processor, the function being part of the task, sending, by the processing element, a request to the main processor for execution, the request including execution of the function and receiving, at the processing element, an indication that the main processor has completed execution of the function specified by the request.

20 Claims, 5 Drawing Sheets

MAIN PROCESSOR SUPPORT OF TASKS PERFORMED IN MEMORY

CROSS REFERENCE TO RELATED APPLICATION

This application is a continuation of U.S. Non-Provisional application Ser. No. 13/669,877, entitled "MAIN PROCESSOR SUPPORT OF TASKS PERFORMED IN MEMORY," filed on Nov. 6, 2012, which is incorporated herein by reference in its entirety.

BACKGROUND

The present invention relates generally to computer systems, and more particularly to a distribution of instructions and tasks among a main processor and processing elements.

Computer systems are continually evolving with new technology leading to increased performance and complexity in the computer systems. In particular, increased capabilities of computer hardware provide improved performance and user experience. For example, computer systems may include accelerators in addition to one or more main processors, where the main processors offload specific tasks to accelerators configured to perform these specific tasks. As accelerators become more sophisticated, the size of tasks offloaded to the accelerators may also increase. In some cases, the increased task size may cause delays and inefficiencies in execution of a program, where the accelerator performing the large task is utilized while other resources in the computer system are underutilized.

SUMMARY

According to one embodiment of the present invention, a computer system for executing a task includes a main processor, a processing element and memory. The computer system is configured to perform a method including receiving, at the processing element, the task from the main processor, performing, by the processing element, an instruction specified by the task, determining, by the processing element, that a function is to be executed on the main processor, the function being part of the task, sending, by the processing element, a request to the main processor for execution, the request including execution of the function and receiving, at the processing element, an indication that the main processor has completed execution of the function specified by the request.

According to one embodiment of the present invention, a computer system for executing a task includes a main processor, a first processing element and a second processing element. The computer system is configured to perform a method including receiving, at the first processing element, the task from the main processor, performing, by the first processing element, an operation specified by the task, determining, by the first processing element, that a function is to be executed on the second processing element, the function being part of the task and sending, by the first processing element, a request to the second processing element for execution of the function specified by the request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
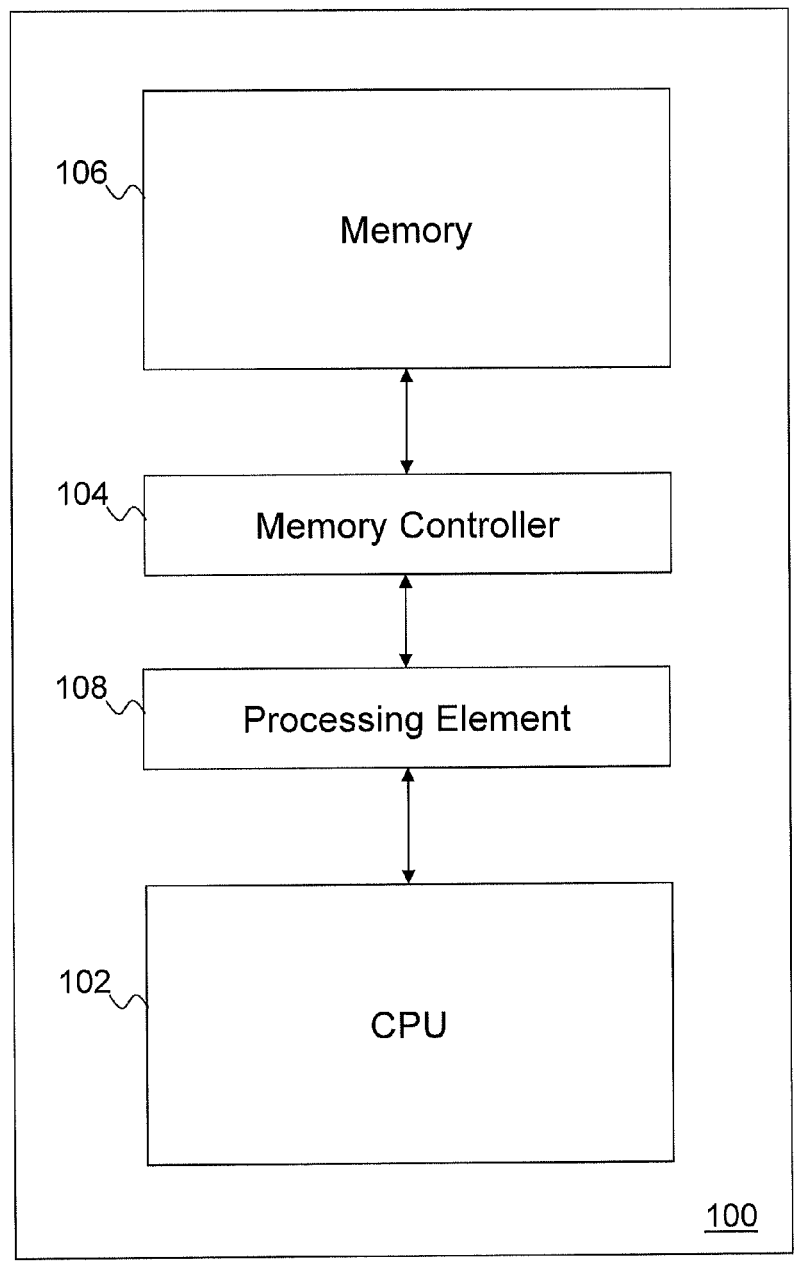
FIG. 1 illustrates a block diagram of a computer system in accordance with an embodiment.

An embodiment is directed to operating a computer system with a main processor and a remote processing unit. In an embodiment, the remote processing unit is a processing element. In embodiments, the remote processing unit may be a processing element in a buffered memory device, as discussed below. In embodiments, the processing element is capable of performing a variety of tasks, such as arithmetic operations, loads, stores and decrements. In one embodiment, the processing element receives a command or task from the main processor, where the task includes a series of instructions to be performed by the processing element.

In addition, the processing element sends a request to the main processor to execute a function, where, upon completion of the function, the main processor provides an indication that the function has been executed. By providing a call to the main processor to perform a requested function, the processing element is able to offload work to the main processor that is better suited for execution by the main processor. The one or more functions or instructions offloaded to the main processor are better suited for execution by the main processor for any number of reasons. In an example, the main processor may be better suited to perform the function based on a location of data used by the function, where the data is not efficiently accessed by or not available to the processing element. In another example, the processing element has limited capability for performing a defined set of instructions or functions and the function offloaded by the request to the main processor includes instructions that are not supported by the processing element (e.g., not in the defined set of instructions).

In one embodiment, the processing element is a processing element in a memory system including a memory device, such as a buffered memory device. The memory device may be any suitable memory device including one or more memory device (e.g., random access memory "RAM" chips) connected to a hub chip (also referred to as a memory controller chip) configured to control the memory device. In an embodiment, the buffered memory device includes layers of memory that form a three dimensional ("3D") memory device where individual columns of memory chips form stacks or vaults in communication with the hub chip. In one embodiment, a plurality of memory stacks are located on a memory module, where each stack has a respective hub chip. The hub chips may include a processing element configured to communicate with the memory and other processing elements in other hub chips. The processing element can receive commands or instructions from a main processor and perform operations based on the received commands. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active buffered memory device. The active buffered memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the processing element of the memory device are address translation capabilities for converting or translating virtual addresses to physical addresses, a unified Load/Store Queue to sequence data movement between the memory and the processing elements, and a processor communications unit, for communication with the main processor.

In one embodiment, the active buffered memory device is configured to load configuration information or instructions from a part of the active buffered memory device into a processing element following receiving a command from an external requestor in the computing system, such as a main processor or another processing element. In addition, the processing element may perform virtual-to-real address translations that it computes while executing the loaded instructions.

In embodiments, it is desirable to have processing capabilities within the active buffered memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active buffered memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

FIG. 1 illustrates a block diagram of a system for storing and retrieving data in a memory in accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the main processor or computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The computer processor 102 provides commands to the memory 106, where the processing element 108 receives the command and fetches corresponding instructions from the memory. In an embodiment, the processing element 108 receives a task as part of the command, where a part of the task may be sent back to the computer processor 102 for execution. The computer processor 102 may be better suited to execute functions specified by the task due to several factors, such as data location and support for the functions. In an embodiment, the memory 106, memory controller 104 and processing element 108 are combined into a single device, such as an active memory device, in communication with the main processor 102.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted, such as a memory system with no processing element 108. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

Figure 2:
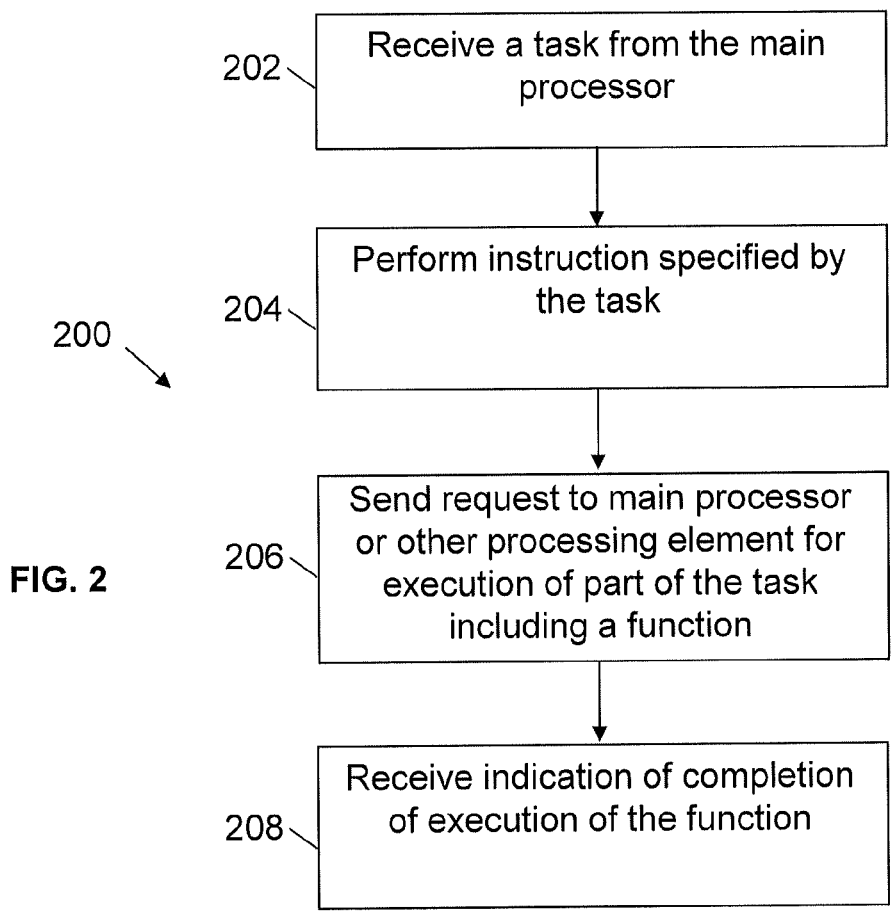
FIG. 2 illustrates a flow diagram of a method for operating a memory system by distributing execution of tasks, instructions and functions in accordance with an embodiment.

FIG. 2 is a flow chart 200 of an exemplary method and system for operating a computer system, such as the computer system 100 in FIG. 1, as well as those discussed below. In an embodiment, one or more of the blocks in the flow chart 200 are performed by a processing element, such as processing element 108. In block 202, a task is received from a main processor, where the task includes operation(s) and/or function(s) performed on data. In block 204, an instruction specified by the task is performed by the processing element. In block 205, the processing element determines that a function included in the task is to be executed on the main processor or another processing element. In an embodiment, a plurality of instructions and/or operations are a part of the task and are performed by the processing element, where the processing element is better suited to perform the instructions and operations for various reasons, such as due to the type of instruction or the proximity of the processing element to the data in memory relevant to the instruction. For example, a processing element may be well suited to accessing data located in a memory stack within the same cube as the processing element, thus improving performance.

In block 206, the processing element sends a request to the main processor or another processing element to execute at least a part of the task, where the part of the task includes a function. In an embodiment the request includes an address pointing to a location of the function to be performed by the main processor or other processing element, where the address is in memory. The function may be better suited for execution on the main processor or another processing element in the system due to a location of the data used by the function. In another embodiment, the function may be better suited for execution on the main processor or another processing element due to support of the function by an instruction set on the main processor or another processing element, where the instruction set provides capability for execution of the function. In the example, the instruction set in the processing element that received the task may not support execution of the function. In block 208, the processing element receives an indication from the main processor or other processing element that the function has completed execution. In an embodiment, while performing execution of the instruction (block 204) the processing element determines the processing location for execution of the function (or a second instruction). The processing location includes the processing element and main processor, where execution of the function is supported by both locations. Detailed descriptions of exemplary processes for requests sent by a processing element to another processing element or a main processor are described below, especially with reference to FIGS. 4 and 5.

Figure 3:
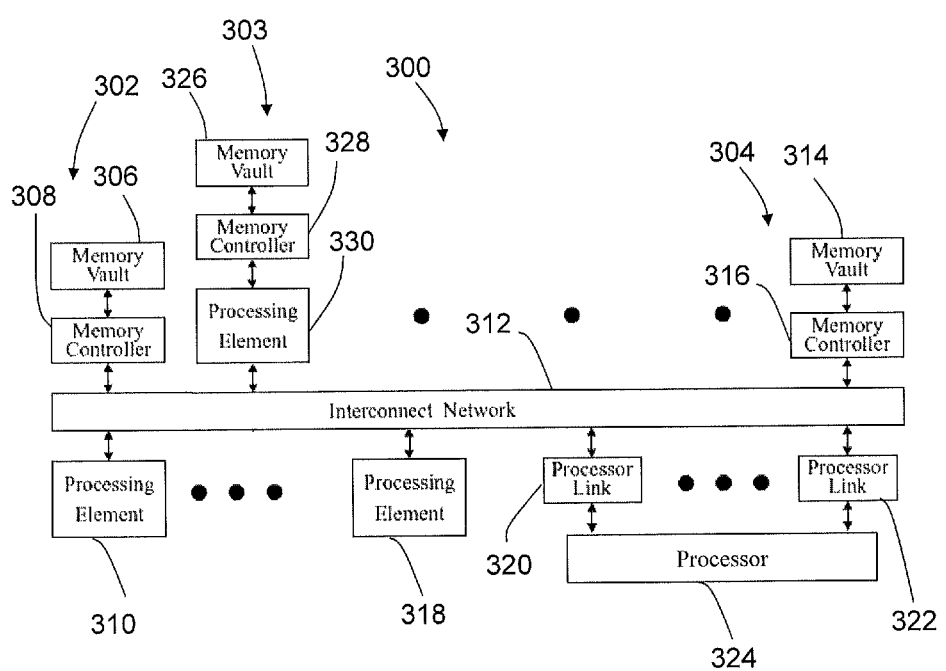
FIG. 3 illustrates a block diagram of a computer system with a main processor, memory and a processing elements in accordance with an embodiment.

FIG. 3 is a schematic diagram of an embodiment of a computer system 300 implementing distribution of tasks, instructions and functions, such as by using processes described herein. In one embodiment, the computer system 300 includes an active buffered memory device 302, an active buffered memory device 303 and an active buffered memory device 304. The active buffered memory device 302 includes a memory vault 306, a memory controller 308 and a processing element 310. In an embodiment, the processing element 310, memory vault 306 and memory controller 308 are coupled and communicate via an interconnect network 312. Specifically, the processing element 310 communicates to the memory vault 306, memory controller 308 and other memory devices, such as active buffered memory devices 303 and 304, via the interconnect network 312. The interconnect network 312 is also coupled to a main processor 324 by processor links 320 and 322. The interconnect network 312 provides a fast and high bandwidth path for communication between portions of the device, such processing elements, memory controllers and memory, to provide improved performance and reduced latency for the active buffered memory.

The active buffered memory device 303 includes a memory vault 326, a memory controller 328 and a processing element 330. In an embodiment, the processing element 330, memory vault 326 and memory controller 328 are all located on the same side of the interconnect network 312, such as within a single stack. By positioning the processing element 330 in the same stack as memory vault 326, the latency is reduced when accessing locations in the memory vault 326, thus further improving performance. In one embodiment, the active buffered memory 304 includes a memory vault 314 and memory controller 316 coupled to processing elements 310 and processing element 318 via the interconnect network 312. As depicted, the processing element 318 is located on the other side of the interconnect network 312 from the memory controller 316 and memory vault 314. In embodiments, the active buffered memory devices 302, 303 and 304 include multiple layers of stacked addressable memory elements. Further, the stack's memory may be divided into memory vaults 306, 326 and 314, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 318, may be positioned on one side of the interconnect network 312 and may operate as a pool of processing elements that are available for accessing any memory in the memory system coupled to the interconnect network 312. The pooled processing elements are not limited to accessing a particular memory vault and, thus, one or more elements may be utilized upon receiving a command from the main processor 324. Accordingly, processing element 318 may be configured to access each memory vault 306, 326 and 314. In another embodiment, one or more processing elements, such as processing element 330, is located as part of a stack including a memory vault 326 and memory controller 328. In such a configuration, the processing element 330 is configured to access memory vault 326 coupled to the interconnect network 312, including memory vaults 306 and 314. In one embodiment, one or more processing elements, such as processing element 310, is positioned on an opposite side of the interconnect network 312 from the memory vault 306 and memory controller 308. In the configuration, the processing element 310 is configured to access any memory coupled to the interconnect network 312, including memory vaults 326 and 314.

In an embodiment, the computer system may include a plurality of active buffered memory devices, such as the active buffered memory devices 302, 303 and 304. Further, each active buffered memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by external requestors, like the main processor, coupled to the interconnect network.

Figure 4:
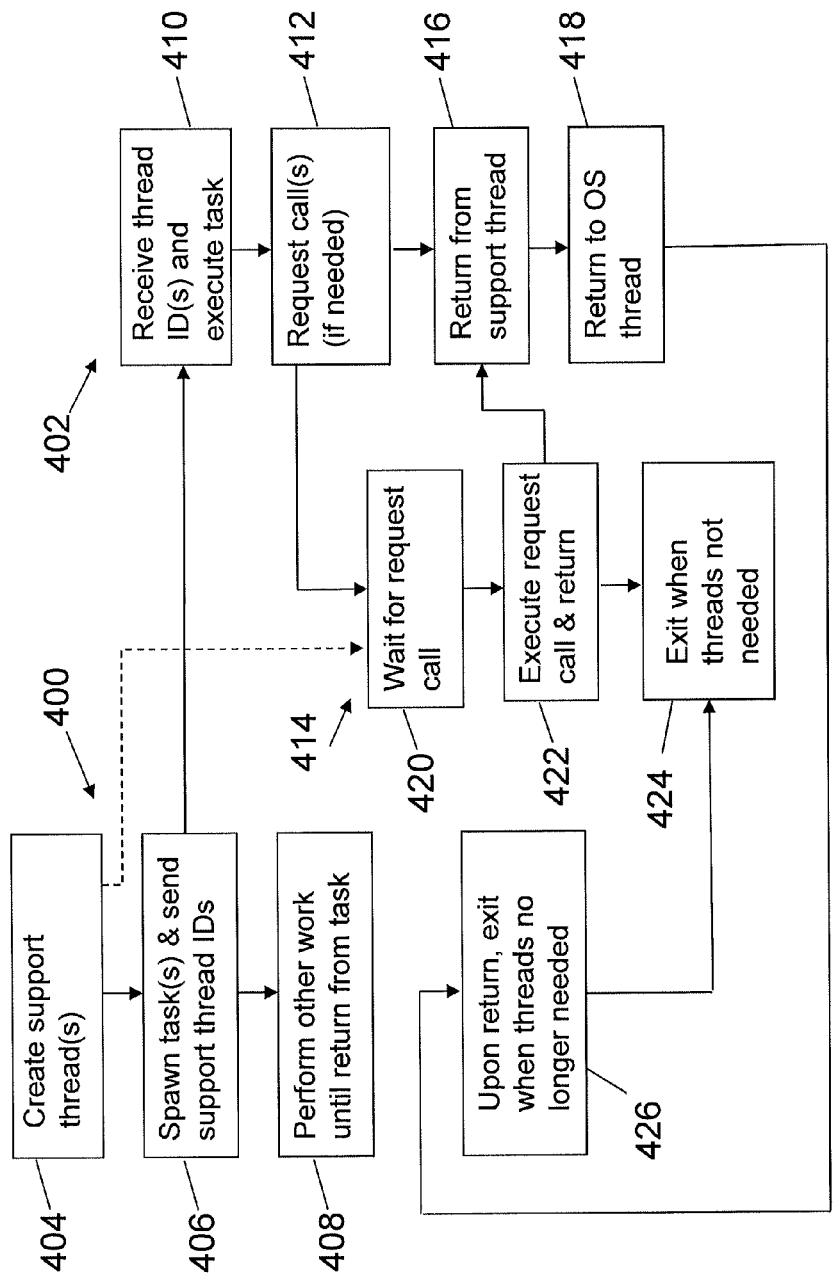
FIG. 4 illustrates a flow diagram of a method for operating a memory system by distributing execution of tasks, instructions and functions in accordance with an embodiment.

FIG. 4 is a flow chart of an exemplary process for operating a computer system, such as those computer systems described above. The blocks 400 may be performed by an operating system ("OS") or a user process (with supporting calls to an OS) running in a main processor and memory of a system while blocks 402 may be performed by a processing element of the system. In block 404, one or more support threads are created by the OS or by the user process, where the support threads run on the main processor to support remote tasks, such as a task running on a processing element. The support thread is represented by blocks 414. In block 406, one or more tasks are spawned or communicated along with support thread identifiers (IDs) to one or more processing elements. In block 408, the OS or user process performs other work (e.g., instructions, etc.) while one or more tasks are completed by processing elements in the system. In block 410, the processing element receives a task and identifiers (IDs) used to call the support threads, where the processing element may execute a request on the support threads by calling the support thread IDs. In embodiments, a plurality of processing elements may each receive a task from the main processor, where the tasks are performed by the processing elements. In addition, a plurality of support threads may be created in block 404, where the support threads may support a plurality of tasks that are performed outside the main processor, such as by the processing elements. Further, a support thread may also support more than one task, where the support thread is called in sequence by a plurality of processing elements. In an embodiment, the tasks are created from a compiled program, wherein the function is identified as capable of being executed by the main processor by the compiler.

Still referring to FIG. 4, the processing element begins performing the task (block 410) and sends a request (block 412) to the supporting thread for execution. In an embodiment, the task includes a plurality of functions or instructions, where the request includes one or more of the functions or instructions specified in the task. As shown in block 420, after it is created, the support thread waits for a request call from a processing element. In block 422, the supporting thread executes a function specified in the request and sends a return communication or value to the processing element. In embodiments, the return value is further utilized by the task to complete execution and provide a result to the OS or user process. In another embodiment, the support thread executes the request and does not send a return value to an element in the computer system. In block 416, the processing element receives a return value from the support thread and proceeds with performing the task, if necessary. In block 418, the processing element has completed the task and returns to the OS or user process thread (blocks 400). In block 426, the OS user process checks to see if all tasks are complete and that support threads are no longer needed and then exits when they are complete. Accordingly, in block 424, the support thread is closed by the OS or user process when the tasks are complete.

Figure 5:
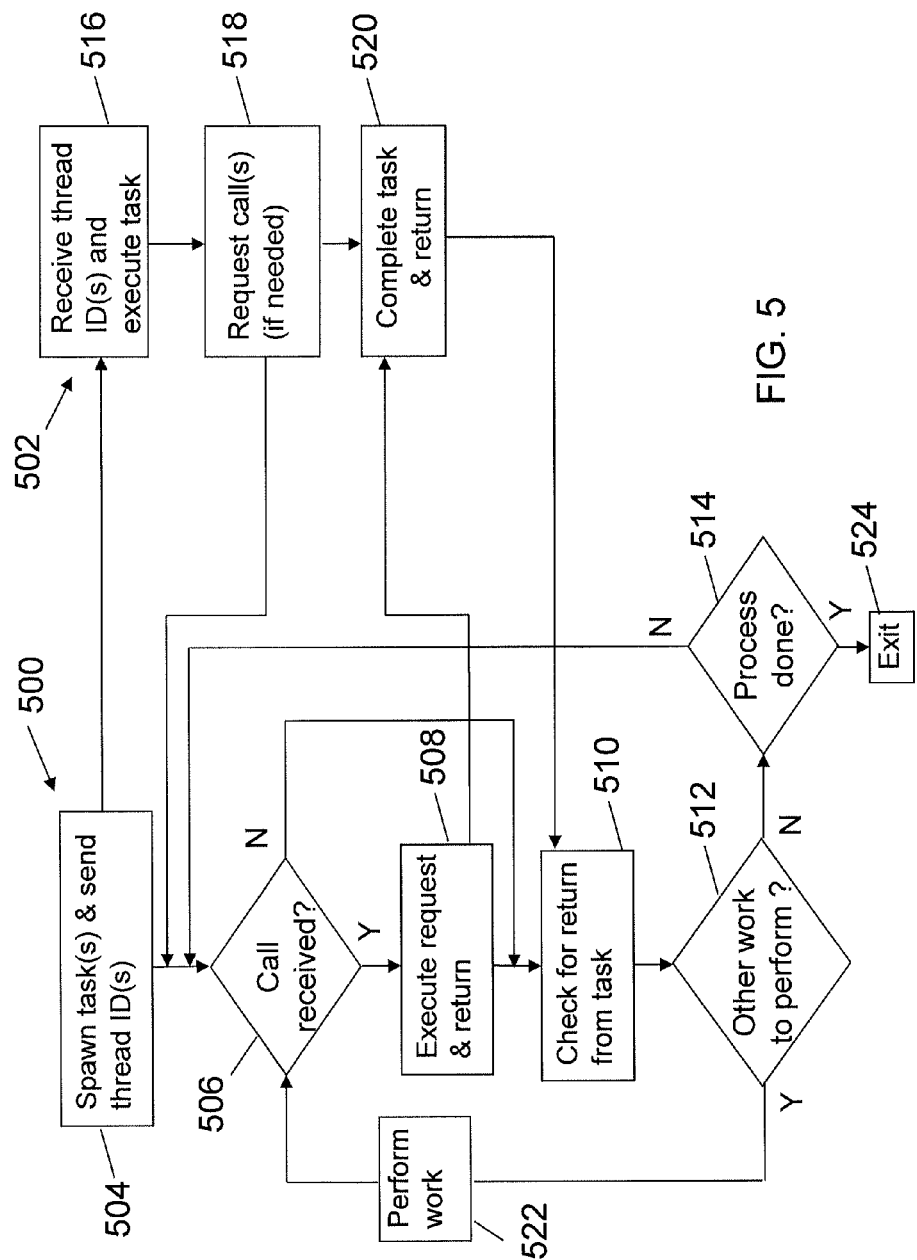
FIG. 5 illustrates a flow diagram of a method for operating a memory system by distributing execution of tasks, instructions and functions in accordance with another embodiment.

FIG. 5 is a flow chart of another exemplary process for operating a computer system, such as those computer systems described above. The illustrated process includes blocks 500 performed by an application running on a main processor and memory of a system as well as blocks 502 performed by a processing element of the system. In an embodiment, an OS running on the main processor schedules the application software thread on a hardware thread, where the application performs the blocks 500. In block 504, the application spawns one or more tasks and also sends thread ID(s) to the processing element. The thread ID(s) may correspond to the application software thread (blocks 500). In embodiments, the application spawns a plurality of tasks that are each sent to respective processing elements. In block 516, the processing element receives the task and thread ID(s) and further begins to perform the task. In block 518, during performance of the task, the processing element performs a request call to the main processor software thread to execute a selected function requested by the processing element. In block 506, the application checks to see if the processing element has made a request call to the software thread. If a call is found, as shown in block 508, the application performs a function in the request and sends a return value or communication to the processing element. If the application does not find a call when checking in block 506, the application moves to block 510 to check if a task has sent a return value to indicate the processing element has completed the task. In addition, the application also checks for a return value in block 510 following execution of the request in block 508.

Referring back to the processing element blocks 502, in block 520 the processing element completes the task and sends a return value to block 510. In embodiments, a plurality of processing elements may each perform tasks, where the application checks for return values for each task in block 510. In one embodiment, once each of the tasks spawned in block 504 are indicated as complete by return values in block 510, the application may be complete. In block 512, the application determines if additional work is to be performed by the application. If there is additional work to be performed, the application loops back to perform the work in 522 and routes to blocks 506 and 510 (and optionally 508) to perform requests from tasks. If there is no additional work in block 512 for the main processor, the block 514 checks if there are additional processing elements performing tasks. If processing elements are still performing, the process routes back to blocks 506 and 510 (optionally 508) to perform requests from tasks. If the tasks on processing elements are completed (in block 514) and the application has completed all other work (block 512), then the application may exit in block 524. In embodiments, the application determines if tasks are complete by processing elements in block 510 where it checks for returns.

Technical benefits include improved performance and efficiency by distribution of commands, tasks, instruction and functions throughout a computer system. In an embodiment, the computer system includes a processing element that sends a request to the main processor to execute a function, where a function requested by the processing element is better suited for execution by the main processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system for executing a task, the computer system comprising:
a main processor, a processing element that includes a programmable engine configured for performing tasks autonomously, and a memory, the computer system configured to perform a method comprising:
receiving, at the processing element, the task and an identifier of a support thread from the main processor;
performing, by the processing element, an instruction specified by the task;
determining, by the processing element, that a function that is part of the task is to be executed on the main processor;
sending, by the processing element, via the support thread, a request to the main processor for execution of the function; and
receiving, at the processing element, an indication that the main processor has completed execution of the function specified by the request.

2. The computer system of claim 1, wherein the request comprises an address pointing to a location of the function.

3. The computer system of claim 1, further comprising creating a plurality of tasks, including the task, from a compiled program, wherein the function is identified as capable of execution by the main processor.

4. The computer system of claim 1, further comprising executing, by the main processor, the function specified by the request.

5. The computer system of claim 1, wherein determining, by the processing element, that the function is to be executed on the main processor comprises determining that the function is to be executed on the main processor based on a location of data accessed by the function.

6. The computer system of claim 1, wherein determining, by the processing element, that the function is to be executed on the main processor comprises determining that the function is to be executed on the main processor based on an inability of an instruction set of the processing element to execute the function.

7. The computer system of claim 1, further comprising creating, in the main processor, the support thread.

8. The computer system of claim 7, wherein sending comprises calling the support thread to execute the request.

9. The computer system of claim 8, further comprising executing, by the support thread in the main processor, the function specified by the request.

10. A computer system for executing a task, the computer system comprising:
a main processor, a first processing element that includes a programmable engine configured for performing tasks autonomously, and a second processing element, the computer system configured to perform a method comprising:
receiving, at the first processing element, the task and an identifier of a support thread from the main processor;
performing, by the first processing element, an operation specified by the task;
determining, by the first processing element, that a function that is part of the task is to be executed on the second processing element; and
sending, by the first processing element, via the support thread, a request to the second processing element for execution of the function specified by the request.

11. The computer system of claim 10, further comprising receiving, at the first processing element, an indication that the second processing element has completed execution of the function.

12. The computer system of claim 10, wherein the request comprises an address pointing to a location of the function.

13. The computer system of claim 10, further comprising creating a plurality of tasks, including the task, from a compiled program, wherein the function is identified as capable of execution by the second processing element.

14. The computer system of claim 10, further comprising executing, by the second processing element, the function specified by the request.

15. The computer system of claim 10, wherein determining, by the first processing element, that the function is to be executed on the second processing element comprises determining that the function is to be executed on the second processing element based on a location of data accessed by the function.

16. The computer system of claim 10, wherein determining, by the first processing element, that the function is to be executed on the second processing element comprises determining that the function is to be executed on the second processing element based on an inability of an instruction set of the first processing element to execute the function.

17. A computer system for executing a task, the computer system comprising:
   a main processor and a processing element that includes a programmable engine configured for performing tasks autonomously, the computer system configured to perform a method comprising:
   receiving, at the processing element, the task and an identifier of a support thread from the main processor, the task including a function that is part of the task, wherein the task supports both execution of the function on the processing element and sending a request via the support thread for execution of the function by the main processor;
   performing, by the processing element, an instruction specified by the task; and
   determining a location for execution of the function based on performing the instruction on the processing element, wherein the location is one of the processing element and the main processor.

18. The computer system of claim 17, wherein the request comprises an address pointing to a location of the function.

19. The computer system of claim 17, wherein determining the location for execution of the function while performing the instruction on the processing element further comprises determining the location for execution of the function based on a result of execution of the instruction on the processing element.

20. The computer system of claim 17, the location for execution of the function while performing the instruction on the processing element further comprises determining the location for execution of the function based on one of: a location of data accessed by the function or an inability of an instruction set of the processing element to execute the function.

* * * * *